United States Patent
Zausner

[11] Patent Number: 5,818,932
[45] Date of Patent: Oct. 6, 1998

[54] TELEPHONE HOUSING INTERLOCK

[75] Inventor: Fredrick Zausner, Port Washington, N.Y.

[73] Assignee: Resco Metal & Plastics Products Corp., Brooklyn, N.Y.

[21] Appl. No.: 819,755

[22] Filed: Apr. 3, 1997

[51] Int. Cl.[6] .................................................. H04M 1/00

[52] U.S. Cl. ......................... 379/453; 379/451; 379/437

[58] Field of Search .................................... 379/453, 451, 379/437, 428, 145, 146, 445

[56] References Cited

U.S. PATENT DOCUMENTS 5,381,469   1/1995   Zausner .................................... 379/437

*Primary Examiner*—Jack Chiang
*Attorney, Agent, or Firm*—Schweitzer Cornman Gross & Bondell LLP

[57] ABSTRACT

A security interlock for the abutting portion of the upper and lower housing of coin-operated pay telephones comprise a pair of interlocking brackets positioned proximate the seam between the housing portions. A first bracket mounted to one housing has a leg portion which overlies the seam, while a second bracket mounted to the second housing portion overlies the first bracket.

9 Claims, 1 Drawing Sheet

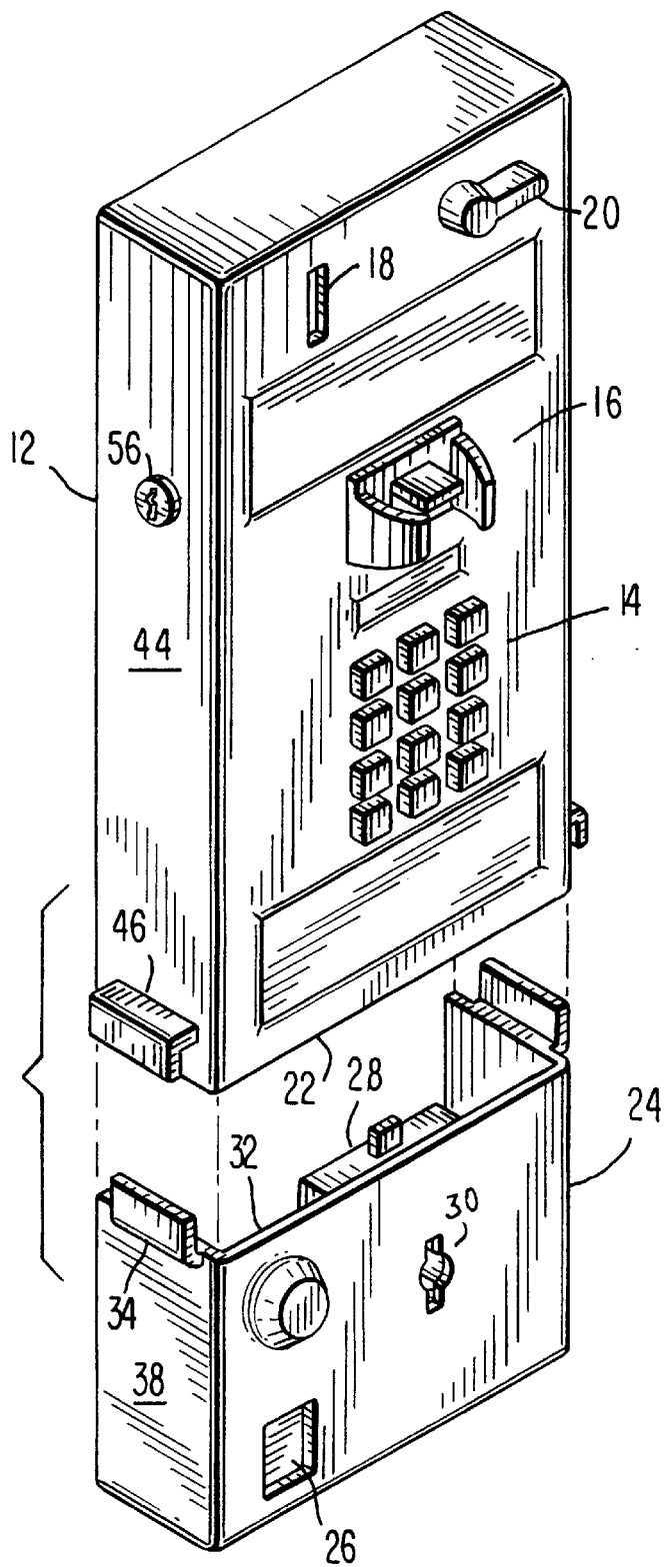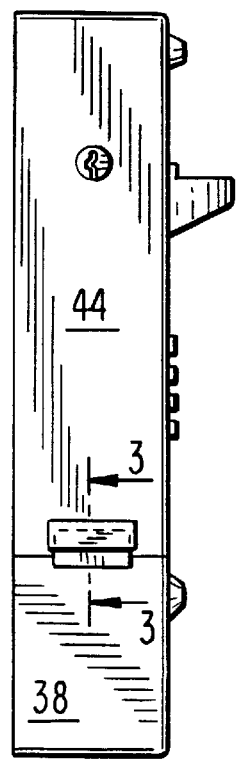

TELEPHONE HOUSING INTERLOCK

The present invention relates to a new and improved security device to assist in maintaining the integrity of pay telephones.

BACKGROUND OF THE INVENTION

Publicly accessible pay telephones have long been an attractive target for vandalism and robbery. Over the years substantial efforts have been made to reinforce the telephone box structure and to place impediments in the way of those persons seeking unauthorized access to the operating components of the telephone and particularly to the telephone's coin box. Such measures have included the incorporation of strengthening panels or overlying housing elements to prevent or at least deter access to the interior of the telephone housing from which the coinbox contents can be reached.

Conventional coin-operated pay telephones often include a two-part housing. In general, an upper housing overlies and covers the electromechanical mechanisms of the telephone, while the lower housing protects and covers the coin box. Such a two-part housing construction facilitates authorized maintenance and repair of the telephone, as a coin collector can be provided with a key to remove the coin box from the lower housing, and thus collect the coins, without exposing or affecting the operative telephone elements located within the upper housing. Similarly, a repairman can remove the upper housing to access the electromechanical components without being able to reach the coin box.

While both the upper and lower housing may be formed or overlaid with materials intended to be tamper resistant, such as heavy gauge steel, the interface between the upper and lower housings provides an external seam which becomes a target for attack. The seam provides an entry point for tools, such as a pry bar, often allowing the tool to get a sufficient purchase to permit the enterprising thief to separate the housing portions sufficiently to defeat or destroy the locking mechanism and thus obtain access to the coin box.

It is accordingly a purpose of the present invention to provide an interlock between the upper and lower housings of coin-operated pay telephones.

Another purpose of the present invention is to provide a security interlock which improves the integrity of the interface between the upper and lower housings of coin-operated pay telephones.

Yet another purpose of the present invention is to improve the security of a coin-operated telephone coin box when located within a telephone lower housing.

A further purpose of the present invention is to provide a coin-operated pay telephone interlock mechanism which does not require internal modification to the housing parts with which it is employed and thus does not affect the placement of the telephone's internal mechanisms.

BRIEF DESCRIPTION OF THE INVENTION

In accordance with the foregoing and other objects and purposes, a security interlock in accordance with the present invention intended for use with coin-operated pay telephones having upper and lower housings comprises a first rigid bracket mounted exterior to the telephone and which extends upwardly from a location adjacent the upper edge of the telephone's lower housing side wall and extends parallel to the side wall for a substantial portion of its length. A second bracket is positioned proximate the lower edge of the adjacent upper housing side wall, projects downwardly therefrom, and extends along a corresponding portion of its length. The two brackets interfit and interlock to provide an overlying cover and shield to the mating side wall edges of the upper and lower housings, thus providing further reinforcement and protection thereto.

BRIEF DESCRIPTION OF THE DRAWINGS

A fuller understanding of the present invention and the operation and benefits associated therewith will be obtained upon review of the following detailed description of a preferred, but nonetheless illustrative thereof, when review in connection with the annexed drawings, wherein:

FIG. 1 is a perspective view of a coin-operated telephone depicting the invention mounted thereon;

FIG. 2 is a side elevation view thereof; and

FIG. 3 is a detailed view in section taken along line 3—3 of FIG. 2.

DETAILED DESCRIPTION OF THE INVENTION

As set forth in the drawings, a conventional coin-operated telephone apparatus 10 includes a removable upper housing 12 in which the electrical and mechanical components of the telephone are located. The upper housing encloses and supports the pushbutton dial matrix 14, a handset cradle 16 and is provided with a coin slot 18 and clearing lever 20. The upper housing has a front wall 52 and a pair of side walls 44. The upper housing terminates at a lower edge 22. As depicted herein, the upper housing typically includes a heavy gauge outer security layer of a rugged and rigid material, such as stainless steel.

The lower housing of the telephone (not shown) encloses and supports the telephone coin collection box (also not shown). Separate lock mechanisms, which may include a key lock 56 for the upper housing, are provided to allow authorized personnel to separately remove the upper housing and coin box portion of the lower housing as required for maintenance or coin collection. As depicted, the lower housing may be provided with a removable overlying protective housing 24. The protective housing is typically constructed of the same material as the outer security layer for the upper housing, fits flush with the upper security layer about their mating edges, and with the upper security layer provides a high strength outer shell for the telephone. The lower protective housing 24 comprises a front wall 54 and side walls 38 jointly terminating at upper peripheral edge 32. The lower protective housing may also include a coin return opening 26 which aligns with the return mechanism in the lower housing which is overlain by the protective housing.

To allow authorized access to the lower housing and the coin box therein, a lock assembly 28, actuated by a key which may be inserted through key slot 30, is provided to allow the lower protective housing to be removed. It is to be recognized that, while the protective layer for the upper housing is typically permanently affixed to the upper housing, forming an integral unit, the protective layer for the lower housing is typically separable therefrom, as only a portion of the lower housing (the coin box) is intended to be removable from the installed telephone.

When the lower protective housing is in place, its upper edge 32 firmly abuts against the lower edge 22 of the upper housing, as shown in FIG. 2. Despite the intimate physical contact, the line of contact therebetween may be used as an entry point by a vandal to separate the lower housing from the upper housing and thus access the enclosed coin collection box.

In accordance with the present invention, the opposed side walls 38 of the lower protective housing are each provided with a first generally L-shaped security bracket 34. The bracket runs substantially along the length of the side wall, the horizontal leg portion 36 of the bracket being affixed to the side wall 38 adjacent the side wall upper edge 32. The bracket is so dimensioned such that the inwardly-facing surface 40 of the vertical leg portion 42 is positioned in an abutting relationship to the adjacent side wall 44 of the upper housing, as seen in FIG. 3.

Second security brackets 46 are mounted to the side walls 44 of the upper housing, proximate the side wall lower edge 22, to overlie the corresponding vertical leg 42 of the first brackets 34. Second security bracket 46 is also generally L-shaped, the horizontal leg portion 48 thereof extending outwardly from the upper housing side wall 44, the bracket being aligned parallel to both side wall lower edge 22 and the opposed first bracket 34. The width of the horizontal leg portion 48 of the second bracket allows the downwardly-extending bracket vertical leg portion 50 to overlie the upwardly directed vertical leg 42 of the first bracket, forming an interlocking structure and a horizontally-extending track between the upper and lower housings. The brackets may be mounted to the respective side walls by welding and may be of substantial thickness and rigidity, being typically fabricated from 1/8" stainless steel.

The upwardly-extending vertical leg 42 of the first bracket overlies the side wall seam between the upper housing and lower protective housing. The downward-facing second bracket 48 covers and protects the upwardly-facing corresponding edge of the first vertical leg, and overlies the interface between the first bracket and the upper housing side wall. Thus, in order for attack to be directed to the seam between the housing elements, the second bracket 46 must be first defeated, allowing access to the first bracket 34, which in turn must be defeated to afford access to the seam. The time and effort which would be required creates a sufficient deterrent to vandalism to maintain the security and integrity of the telephone. In addition, since the mounting mechanisms for the upper housing and lower protective housing typically require that the released member be moved horizontally outwardly and away from the telephone unit, the brackets provide a track system, facilitating alignment for the removed element upon reinstallation.

I claim:

1. A security interlock for a coin-operated telephone, said telephone comprising a front housing having an upper housing portion with a lower edge and a lower housing portion with an upper edge, said lower and upper edges abutting each other to form a line of abutment between the upper and lower housing portions, at least one of said upper and lower housing portions being removable, the interlock comprising:

first bracket means mounted to one of the upper and lower housing portions proximate the line of abutment, said first bracket means comprising a leg which overlies a portion of the other of said lower and upper housing portions proximate the line of abutment; and second bracket means mounted to the other of said upper and lower housing portions, said second bracket means comprising a leg which overlies the leg of said first bracket means.

2. The security interlock of claim 1, wherein said first and second bracket means are of L-shape construction.

3. The security interlock of claim 2, wherein said first bracket means comprise a bracket mounted to a side of the one of the housing portions and said second bracket means comprise a bracket mounted to a side of the other of the housing portions.

4. The security interlock of claim 1, wherein said first bracket means comprise a first bracket mounted to a first side of the lower housing and a second bracket mounted to a second side of the lower housing, said second bracket means comprise a first bracket mounted to a first side of the upper housing and a second bracket mounted to a second side of the upper housing.

5. The security interlock of claim 4, wherein said brackets of said first bracket means are of L-shape construction.

6. The security interlock of claim 5, wherein said brackets of said second bracket means are of L-shape construction.

7. The security interlock of claim 6, wherein said L-shaped brackets of said first bracket means each include a first leg overlying the upper edge of the lower housing side to which the bracket is mounted and a second leg positioning said first leg in an abutting relationship to the adjacent side of the upper housing.

8. The security interlock of claim 7, wherein said L-shaped brackets of said second bracket means each include a first leg overlying the first leg of the adjacent first bracket means bracket and a second leg positioning said first leg in an abutting relationship to the adjacent first bracket means bracket.

9. The security interlock of claim 2 wherein said first and second bracket means form a track for the removal and mounting of said at least one removable housing.

* * * * *